(12) United States Patent
Mao et al.

(10) Patent No.: US 9,806,559 B2
(45) Date of Patent: *Oct. 31, 2017

(54) REVERSIBLE BUCK OR BOOST CONVERTER THAT DETERMINES BOOST OUTPUT CURRENT FROM SENSED BOOST INPUT CURRENT

(71) Applicant: Active-Semi, Inc., Tortola (VG)

(72) Inventors: Hong Mao, Sunnyvale, CA (US);
Wei-Chung Wu, Richardson, TX (US)

(73) Assignee: Active-Semi, Inc. (VG)

( * ) Notice: Subject to any disclaimer, the term of this patent is extended or adjusted under 35 U.S.C. 154(b) by 124 days.

This patent is subject to a terminal disclaimer.

(21) Appl. No.: 14/881,944

(22) Filed: Oct. 13, 2015

(65) Prior Publication Data
US 2016/0036266 A1 Feb. 4, 2016

Related U.S. Application Data

(63) Continuation of application No. 13/964,357, filed on Aug. 12, 2013, now Pat. No. 9,178,382.

(51) Int. Cl.
*H02J 7/00* (2006.01)
*H02J 7/04* (2006.01)
*H02M 3/158* (2006.01)
*H02J 7/10* (2006.01)

(52) U.S. Cl.
CPC ............ *H02J 7/045* (2013.01); *H02J 7/0068* (2013.01); *H02J 7/0072* (2013.01); *H02M 3/1582* (2013.01); *H02J 2007/0059* (2013.01); *H02J 2007/10* (2013.01)

(58) Field of Classification Search
USPC ................................... 320/160–165
See application file for complete search history.

(56) References Cited

U.S. PATENT DOCUMENTS

| | | | |
|---|---|---|---|
| 9,178,382 B2 * | 11/2015 | Mao | H02J 7/045 |
| 2002/0140403 A1 | 10/2002 | Reddy | 320/162 |
| 2004/0113589 A1 * | 6/2004 | Crisp | H02J 7/0006 320/128 |
| 2005/0001607 A1 | 1/2005 | Berland et al. | 324/67 |
| 2007/0257642 A1 * | 11/2007 | Xiao | H02J 7/0026 320/134 |
| 2009/0160425 A1 * | 6/2009 | Berland | G01R 31/3277 324/67 |

* cited by examiner

*Primary Examiner* — Binh Tat
(74) *Attorney, Agent, or Firm* — Imperium Patent Works; T. Lester Wallace; Amir V. Adibi

(57) ABSTRACT

A reversible buck or boost converter is operable in a buck mode and in a boost mode. In the buck mode, the converter receives a supply voltage via an input terminal and generates a charging current that is supplied to a battery, thereby charging the battery. The supply voltage is also supplied through the converter to an output terminal. In a boost mode, the converter receives power form the battery and generates a supply current and voltage that is output onto the output terminal. The same single current sense resistor is used both to control the charging current in the buck mode and to control a constant current supplied to the output terminal in the boost mode. The output current is controlled to be constant, regardless of changes in the in the battery voltage and changes in the output voltage.

20 Claims, 5 Drawing Sheets

DUAL-MODE POWER CONVERTER

DUAL-MODE POWER CONVERTER

STEP-DOWN BUCK MODE

STEP-UP BOOST MODE
(SCA METHOD)

STEP-UP BOOST MODE
(ASCA METHOD)

REVERSIBLE BUCK OR BOOST CONVERTER THAT DETERMINES BOOST OUTPUT CURRENT FROM SENSED BOOST INPUT CURRENT

CROSS REFERENCE TO RELATED APPLICATIONS

This application is a continuation of, and claims priority under 35 U.S.C. §120 from, nonprovisional U.S. patent application Ser. No. 13/964,357 entitled "Reversible Buck Or Boost Converter That Determines Boost Output Current From Sensed Boost Input Current," filed on Aug. 12, 2013, now U.S. Pat. No. 9,178,382, the subject matter of which is incorporated herein by reference.

TECHNICAL FIELD

The present disclosure relates generally to reversible buck or boost power converters, and more particularly to battery charging reversible buck or boost power converters.

BACKGROUND INFORMATION

A light-weight portable auxiliary battery pack device for use with portable electronic devices (for example, cellular telephones) includes a rechargeable battery. Such an auxiliary battery pack device may have a slim piggy-back structure and form that fits under and around the sides of a cellular telephone so that the cellular telephone can be slid into the device. The device typically includes a plug connector that engages the main dock receptacle connector of the cellular telephone when the cellular telephone is in place in the device. Examples of such auxiliary battery pack devices are the Juice Pack line of products available from the on-line store of Mophie, LLC at www.mophie.com.

The cellular telephone typically is supplied to the user with an AC-to-DC wall adapter that supplies proper power to the cellular telephone. If AC wall power is available, then the AC-to-DC wall adapter is plugged into the auxiliary battery pack device. The cord and plug of the AC-to-DC wall adapter is used for this purpose. Power from the AC-to-DC wall adapter then charges the battery of the auxiliary battery pack device through the cord. In addition, the cellular telephone may be plugged into the auxiliary battery pack device. If the cellular telephone is plugged into the auxiliary battery pack device, then power from the AC-to-DC wall adapter is also provided through the battery pack device to the cellular telephone through the main dock receptacle connector of the cellular telephone. In this condition, the battery is being charged at the same time that the cellular telephone is also operable from AC wall power. If the auxiliary battery pack device is then unplugged from the AC wall adapter or otherwise ceases to receive power, then the auxiliary battery pack device uses its battery as a power source. In some examples, a DC-to-DC converter within the auxiliary battery pack device converts the DC voltage from the battery into a suitably regulated supply voltage for powering the cellular telephone. The cellular telephone is then powered from the battery of the auxiliary battery pack device. From the perspective of the cellular telephone, the cellular telephone is receiving proper DC power through its mail dock receptacle connector just as if the cellular telephone were receiving power from its AC-to-DC wall adapter or from a docking station.

Methods and structures for improving such auxiliary battery pack devices are sought.

SUMMARY

A dual-mode power converter (also referred to here as a "reversible buck or boost converter") is operable in a buck mode and in a boost mode. The dual-mode power converter includes a dual-mode power converter integrated circuit, an input connector or socket, an input capacitor, an output capacitor, and output connector or socket, an inductor, a current sense resistor, a rechargeable battery, a battery capacitor, a current limit setting resistor, as well as other components.

In the buck mode, the dual-mode power converter is typically connected via the input connector to an AC-to-DC wall adapter. The AC-to-DC wall adapter converts AC wall power (for example, 110 VAC) into a DC supply voltage that is supplied to the dual-mode power converter via the input connector. The DC supply voltage is received onto the dual-mode power converter integrated circuit on a terminal VIN. A VIN input current limiting switch couples the terminal VIN to a terminal VOUT as long as the current through the VIN input current limiting switch does not exceed a predetermined VIN input current limit level. Switches within the dual-mode power converter integrated circuit, the inductor, and the sense resistor form parts of a buck converter that supplies a charging current into the battery, thereby charging the battery. The charging current flows out of a terminal SW of the integrated circuit, across the sense resistor, and into the battery. In the buck mode, the DC supply voltage from the AC-to-DC wall adapter can also be supplied through the dual-mode power converter to a device (for example, a cellular telephone) that is coupled via the output connector to the dual-mode power converter. An output current flows out of the output terminal VOUT, and through the output connector, and into the device. The device can therefore be operated from wall power. As the battery charges, the battery voltage increases (for example, from a fully uncharged voltage of about 3.0 volts to a fully charged voltage of about 4.2 volts). The magnitude of the charging current is detected and controlled by detecting the voltage drop across the sense resistor. If the VIN input current through the input current limiting switch exceeds a predetermined input current limit level, then the current limiting switch operates in a regulated constant current mode and a modulation signal reduces the step-down buck converter maximum output current. This mechanism prioritizes current usage for the device over the battery.

In the boost mode, the battery of the dual-mode power converter is used as a power source. The switches within the dual-mode power converter integrated circuit, the inductor, and the sense resistor form parts of a boost converter that receives DC power from the battery and generates therefrom an output voltage and output current that are supplied via the output connector to the device (for example, a cellular telephone). If the output current supplied out of the output terminal VOUT to the device reaches a predetermined current limit value, then a constant current control feedback loop controls the output current to be a constant current. If, on the other hand, the output current supplied out of the output terminal VOUT is below the predetermined current limit value, then a constant voltage feedback control loop supplies the device with a constant voltage via the output connector. In the boost mode, the very same current sense resistor as was used in the buck mode is used to determine the magnitude of the output current. A voltage drop across the current sense resistor is detected, and from this voltage a voltage signal $V_{IOUT\_PROP}$ is generated whose magnitude varies in proportion to the magnitude of the output current, irrespective of changes in the output voltage at the VOUT terminal, and irrespective of changes in the battery voltage. The same one and only one current sense resistor is used to determine the magnitude of the charging current in the buck mode and to determine the magnitude of the output current in the boost mode.

In one specific example, in the boost mode when the constant current feedback control loop is in operation and is controlling the output current flowing out of the VOUT terminal to be a constant current, the voltage drop across the current sense resistor is detected by a current sense amplifier. A current sense signal current output by the current sense amplifier is chopped. The resulting chopped current $I_{CHOP}$ is then multiplied with the resistance of and averaged by the capacitance of an RC filter, thereby generating the signal $V_{IOUT\_PROP}$. The signal $V_{IOUT\_PROP}$ is supplied onto a first input lead of an error amplifier, and a reference voltage $V_{IREF}$ is supplied onto a second input lead of the error amplifier. The magnitude of $V_{IREF}$ sets the magnitude of the constant current. The resulting error signal $V_{IERR}$ as output by the error amplifier is supplied via a compensation filter circuit to a pulse width controller. The pulse width controller outputs pulse width modulated control signal to the first and second switches. The pulse width modulated control signal supplied to the main switch is of duty cycle D when the boost converter is in steady state. This pulse width modulated control signal is digitally inverted to generate a signal of duty cycle 1-D. This inverted signal is then supplied to the chopper to control the duty cycle of the chopped signal $I_{CHOP}$. Due to the duty cycle with which the output of the current sense amplifier is chopped, the resulting voltage signal $V_{IOUT\_PROP}$ has a magnitude that varies in proportion to the magnitude of the output current, irrespective of changes in the output voltage at the output connector, and irrespective of changes in the battery voltage.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
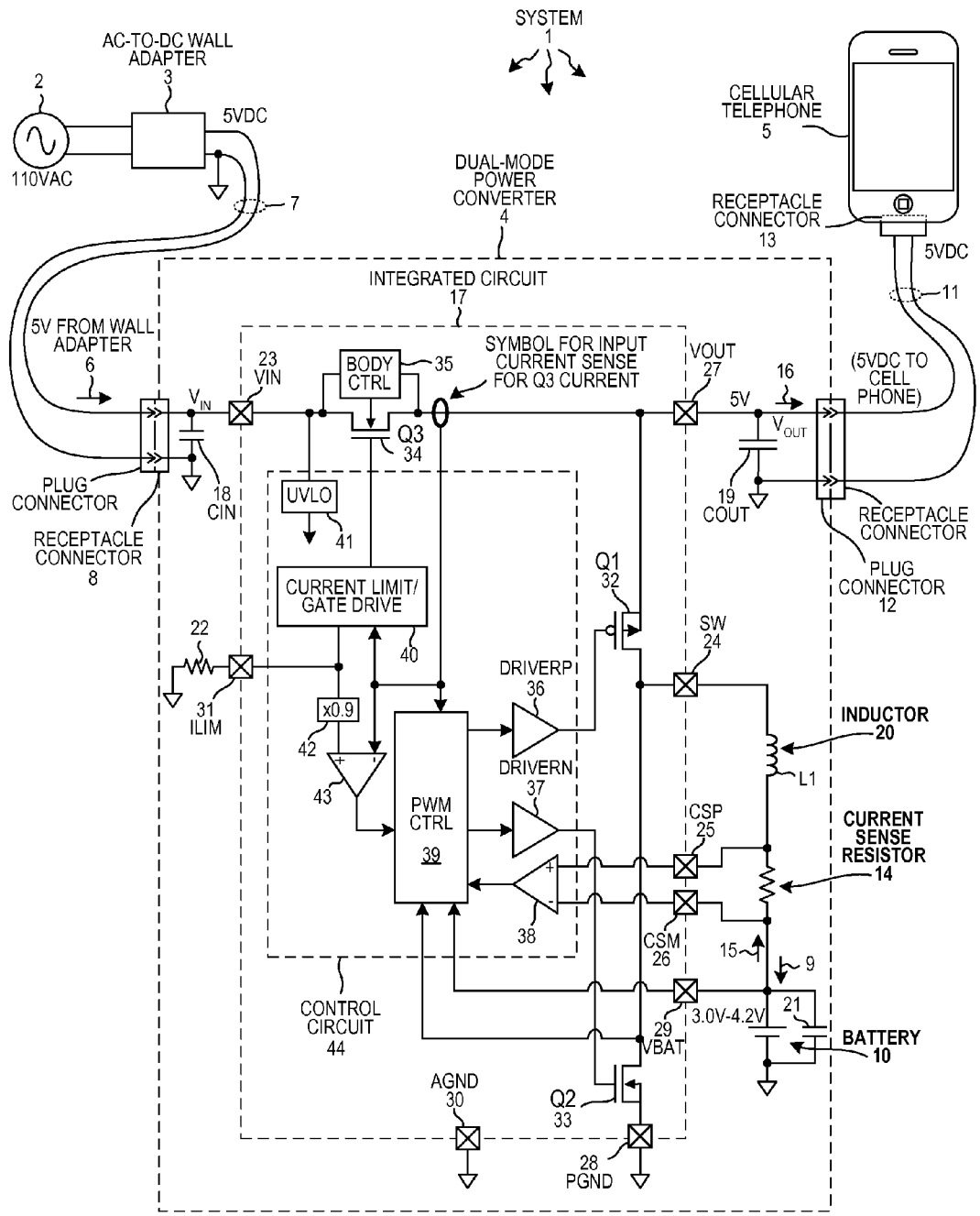
FIG. 1 is a diagram of a system 1 involving a reversible buck or boost converter 4 in accordance with one novel aspect.

FIG. 1 is a diagram of a system 1. System 1 includes a supply voltage source 2, an AC-to-DC wall adapter 3, a dual-mode power converter 4 (also referred to as a "revers-ible buck or boost converter"), and a device 5 to be powered (for example, a cellular telephone). In the present example, the supply voltage source is ordinary 110 VAC wall power. The AC-to-DC wall adapter 3 receives this 110 VAC and generates a 5 volt DC output supply voltage. The supply voltage is supplied to the dual-mode power converter 4 via a multi-conductor cable 7. The cable 7 has a plug that plugs into a receptacle connector 8 on the dual-mode power converter 4. The dual-mode power converter 4 operates in a step-down buck mode so as to receive an input current 6 at 5 volts DC, to provide it to output terminal VOUT 27 via an input current limiting switch Q3 34, and to supply a controlled charging current 9 at lower voltage to rechargeable battery 10. As the rechargeable battery 10 charges, the voltage $V_{BAT}$ across the battery increases. $V_{BAT}$ may, for example, start at 3.0 volts for a fully discharged battery and may end at 4.2 volts for a fully charged battery. The 5 volt DC supply voltage from the wall adapter 3 is also supplied through the dual-mode power converter 4 to the device 5. The connection to device 5 may be through a multi-conductor cable 11 that has connectors on either end. Alternatively a plug connector 12 of the dual-mode power converter 4 plugs into a corresponding receptacle connector 13 of the cellular telephone 5 when the cellular telephone 5 is slid into a receiving slot in the converter 4.

Once the device 5 has been coupled to the converter 4, the device 5 can be powered continuously at 5 volts DC in this manner from the AC-to-DC wall adapted 3 through the input current limiting switch 34 in the dual-mode power converter 4 as long as the current through the input current limiting switch 34 does not exceed a predetermined input current limit level. If the current through the input current limiting switch 34 exceeds the predetermined input current level, then the current limiting switch 34 operates in a regulated current mode. The battery 10 is simultaneously charged by the charging current 9 whose magnitude is controlled by the dual-mode power converter 4. The magnitude of the charging current 9 is monitored by detecting the voltage drop across a current sense resistor 14.

If the AC-to-DC wall adapter 3 is then disconnected from the dual-mode power converter 4, the dual-mode power converter 4 begins operating in a step-up boost mode. In the step-up boost mode, the battery 10 serves as a DC voltage source of the supply voltage $V_{BAT}$. As explained above, $V_{BAT}$ may be in a range from 3.0 volts to 4.2 volts. The dual-mode power converter 4 converts a discharge current 15 at this DC source voltage $V_{BAT}$ into a 5 volt supply voltage $V_{OUT}$. The resulting 5 volt supply voltage $V_{OUT}$ is supplied as an output current $I_{OUT}$ 16 via connector 12 to the device 5. The voltage $V_{BAT}$ on the battery drops as the battery discharges, but the voltage $V_{OUT}$ as supplied to the device 5 is a regulated 5 volts DC provided that a current limit (for example, 500 mA) is not reached. If the output current $I_{OUT}$ 16 being drawn by the device 5 reaches the current limit, then the output current $I_{OUT}$ is controlled not to exceed a predetermined constant current (for example, 500 mA). Dual-mode power converter 4 includes a dual-mode power converter integrated circuit 17, the receptacle connector 8, an input capacitor 18, an output capacitor 19, the plug connector 12, an inductor 20, the current sense resistor 14, the battery 10, a battery capacitor 21, a current limit setting resistor 22, as well as other components (not shown). Dual-mode power converter integrated circuit 17 includes a first terminal VIN 23, a second terminal SW 24, a third terminal CSP 25, a fourth terminal CSM 26, a fifth terminal VOUT 27, a sixth terminal PGND 28, a seventh terminal VBAT 29, an eighth terminal AGND 30, a ninth terminal ILIM 31, a first switch Q1 32, a second switch Q2 33, an input current limiting third switch Q3 34, a body control circuit 35, a driver 36 for switch Q1, a driver 37 for switch Q2, a current sense amplifier 38, a pulse width modulator controller 39, a current limit/gate drive circuit 40, an undervoltage lockout circuit 41, a scaling circuit 42, and an amplifier 43. Components 36-43 are referred to together here as a control circuit 44. In the step-down buck mode, the control circuit 44 controls the switches 32, 33 and 34 so that the dual-mode power converter 4 receives the input current 6 at 5 volts DC on terminal VIN 23, connects it to terminal VOUT 27 as long as the input current does not exceed a predetermined input current limit level, and supplies the controlled charging current 9 into battery 10. If the input current through switch 34 exceeds a predetermined input current limit level, then the switch 34 operates in a regulated current mode and amplifier 43 provides a modulation signal to reduce the step-down buck converter maximum output current. This mechanism prioritizes current usage for device 5 over the battery 10. In the step-up boost mode, the control circuit 44 converts the battery discharge current 15 at the DC voltage $V_{BAT}$ into the output current $I_{OUT}$ that is supplied via terminal VOUT 27 to the device 5.

Figure 2:
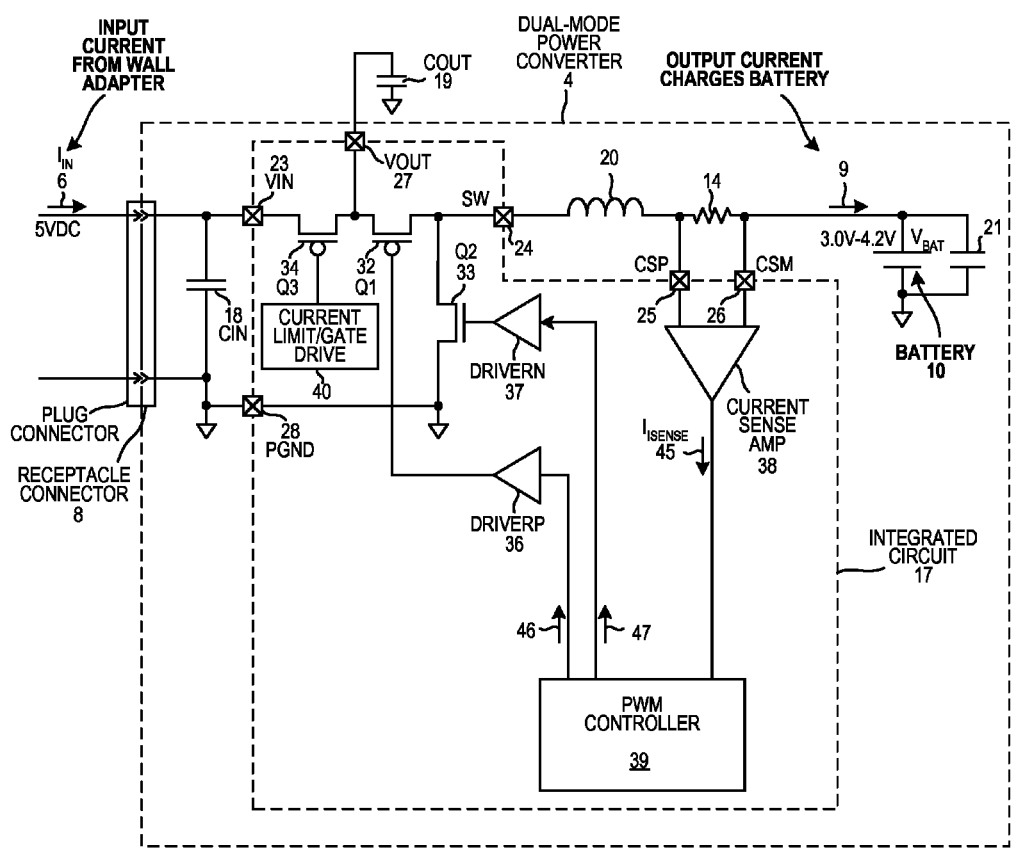
FIG. 2 is a diagram that illustrates operation of the reversible buck or boost converter 4 of FIG. 1 in the step-down buck mode.
Figure 3:
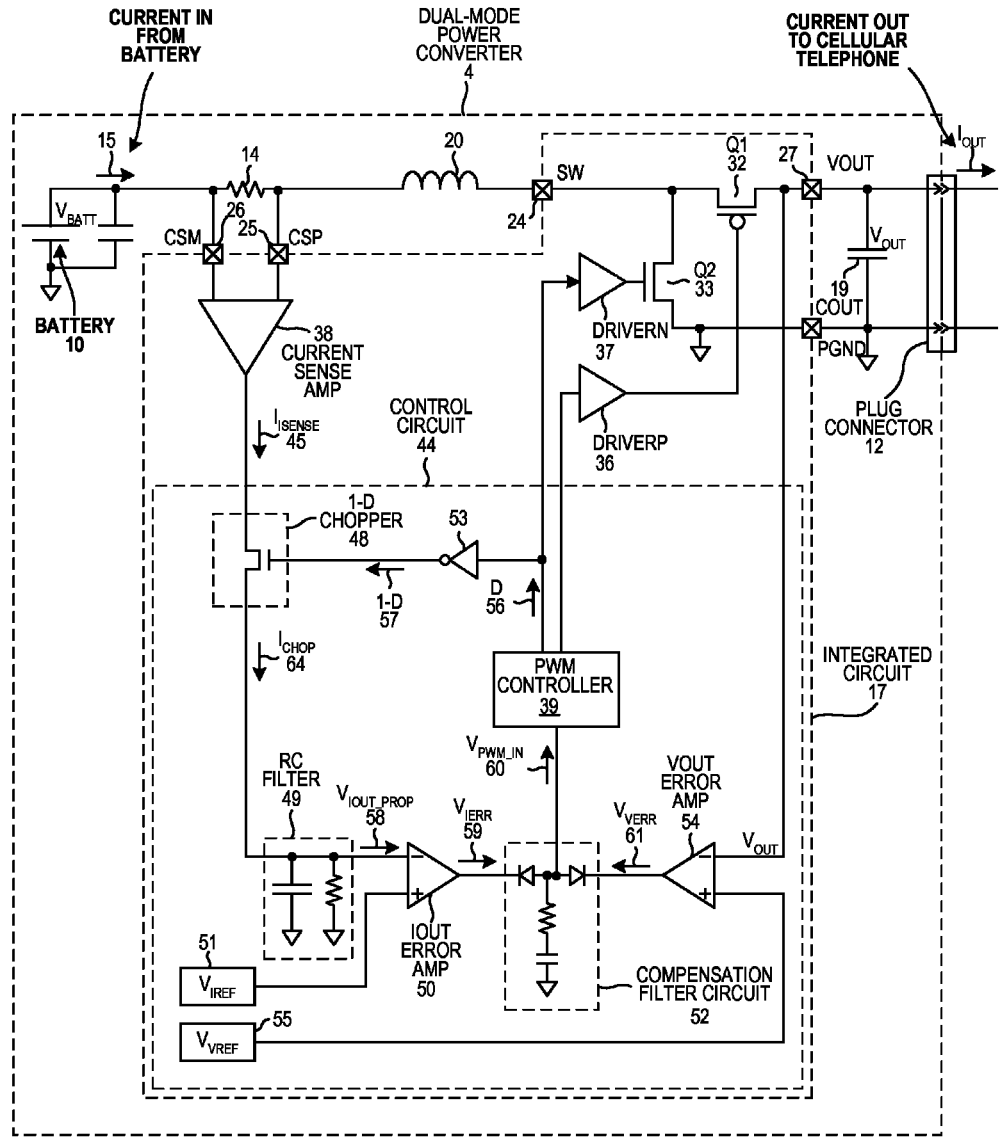
FIG. 3 is a diagram that illustrates operation of the reversible buck or boost converter 4 of FIG. 1 in the step-up boost mode.

FIG. 2 is a diagram that illustrates operation of the dual-mode power converter 4 in the step-down buck mode. Current sense amplifier 38 is a transconductance amplifier. Current sense amplifier 38 supplies a current sense signal $I_{ISENSE}$ 45 to the pulse width modulator controller 39. The pulse width modulator controller 39 uses the sense signal $I_{ISENSE}$ 45 to limit the step-down buck mode output current. In the step-down buck mode, P-channel FET switch 32 is the main switch and N-channel FET switch 33 is the synchronous rectifier. Signals 46 and 47 are pulse width modulated control signals supplied to the first and second switches. The input current limiting switch Q3 34 couples terminal VIN 23 to terminal VOUT 27 as long as the current through the input current limiting switch Q3 34 does not exceed a predetermined input current limit level FIG. 3 is a diagram that illustrates operation of the dual-mode power converter 4 in the boost mode. The control circuit 44 provides a current control feedback loop and a voltage control feedback loop. The current control feedback loop involves the current sense amplifier 38, a 1-D chopper 48, a low pass filter 49, an error amplifier 50, a $V_{IREF}$ reference voltage source 51, a compensation filter circuit 52, the pulse width modulator controller 39, an inverter 53, the drivers 36 and 37, and the switches 32 and 33. The voltage control feedback loop involves error amplifier 54, a $V_{VREF}$ reference voltage source 55, the compensation filter circuit 52, the pulse width modulator controller 39, the drivers 36 and 37, and the switches 32 and 33. The current control feedback loop is to control the output current $I_{OUT}$ to be a constant current, but the sensed input current $I_{IN}$ cannot simply be scaled by a constant value to obtain a signal whose magnitude varies in proportion to the output current because changes in the input voltage $V_{IN}$ and in the output voltage $V_{OUT}$ affect the proper scaling. To obtain a signal $V_{IOUT\_PROP}$ 58 whose magnitude varies in proportion to the magnitude of the output current $I_{OUT}$, it is recognized that the input power to the boost converter is roughly equal to the output power of the boost converter. Accordingly, $I_{IN}*V_{IN}=I_{OUT}*V_{OUT}$. The output current $I_{OUT}$ is therefore equal to $I_{IN}*(V_{IN}/V_{OUT})$. The quantity $I_{IN}$ is measured by the sense amplifier 38. A signal representing the quantity $V_{IN}/V_{OUT}$ is obtained by recognizing that in boost converter operation in steady state, the output voltage $V_{OUT}$ of the boost converter is related to the switching cycle duty cycle D of the main switch by the equation: $D=(1-V_{IN}/V_{OUT})$. In the example of FIG. 3 in the boost mode, the battery 10 is supplying the input voltage to the converter, so $V_{IN}$ is $V_{BAT}$. If terms are rearranged, then: $(V_{IN}/V_{OUT})=(1-D)$. Where D is the duty cycle of a digital signal, a signal of duty cycle 1-D can be obtained by inverting the signal of duty cycle D. In the example of a boost converter, the N-channel FET switch 33 is the main switch and the P-channel FET switch 32 is the synchronous rectifier. Accordingly, the control signal 56 of duty cycle D that is supplied to the main switch 33 when the boost converter is in steady state is inverted by inverter 53 to obtain a signal 57 having a duty cycle of (1-D). The signal $I_{ISENSE}$ 45 as output by the current sense amplifier 38 is effectively multiplied by $V_{IN}/V_{OUT}$ by chopping signal $I_{ISENSE}$ 45 with a duty cycle (1-D) to obtain the signal $I_{CHOP}$ 64, and then averaging $I_{CHOP}$ 64 and converting the average into a voltage signal $V_{IOUT\_PROP}$ 58 using low pass filter 49. The averaged signal $V_{IOUT\_PROP}$ 58 has a magnitude that varies in proportion to the magnitude of the output current $I_{OUT}$, irrespective of whether the output voltage $V_{OUT}$ changes, and irrespective of whether the input voltage $V_{IN}$ changes. The error amplifier 50 then compares the signal $V_{IOUT\_PROP}$ to the reference voltage $V_{IREF}$ (that is supplied by the reference voltage source 51) so as to generate an error signal $V_{IERR}$ 59. If the output current $I_{OUT}$ is greater than a predetermined current limit, as determined by $V_{IREF}$, then the current control feedback loop controls and the $V_{IERR}$ signal 59 passes through the compensation filter circuit 52 and to the pulse width modulator controller 39 in the form of signal $V_{PWM\_IN}$ 60. The current control feedback loop causes the output current $I_{OUT}$ to have a constant current value of $I_{T=}$. The magnitude of this constant current is set by setting $V_{IREF}$.

If the output current $I_{OUT}$ is below the predetermined current limit, then the voltage control feedback loop is operational. Error amplifier 54 compares the output voltage $V_{OUT}$ to the reference voltage value $V_{IREF}$, thereby generating an error signal $V_{VERR}$ 61. The error signal $V_{VERR}$ 61 passes through the compensation filter circuit 52 and is supplied in the form of signal $V_{PWM\_IN}$ to the pulse width modulator controller 39. Provided that $V_{IOUT\_PROP}$ is less than $V_{IREF}$, the voltage control feedback loop controls and operates to maintain the output voltage $V_{OUT}$ at a constant voltage determined by $V_{VREF}$.

Figure 4:
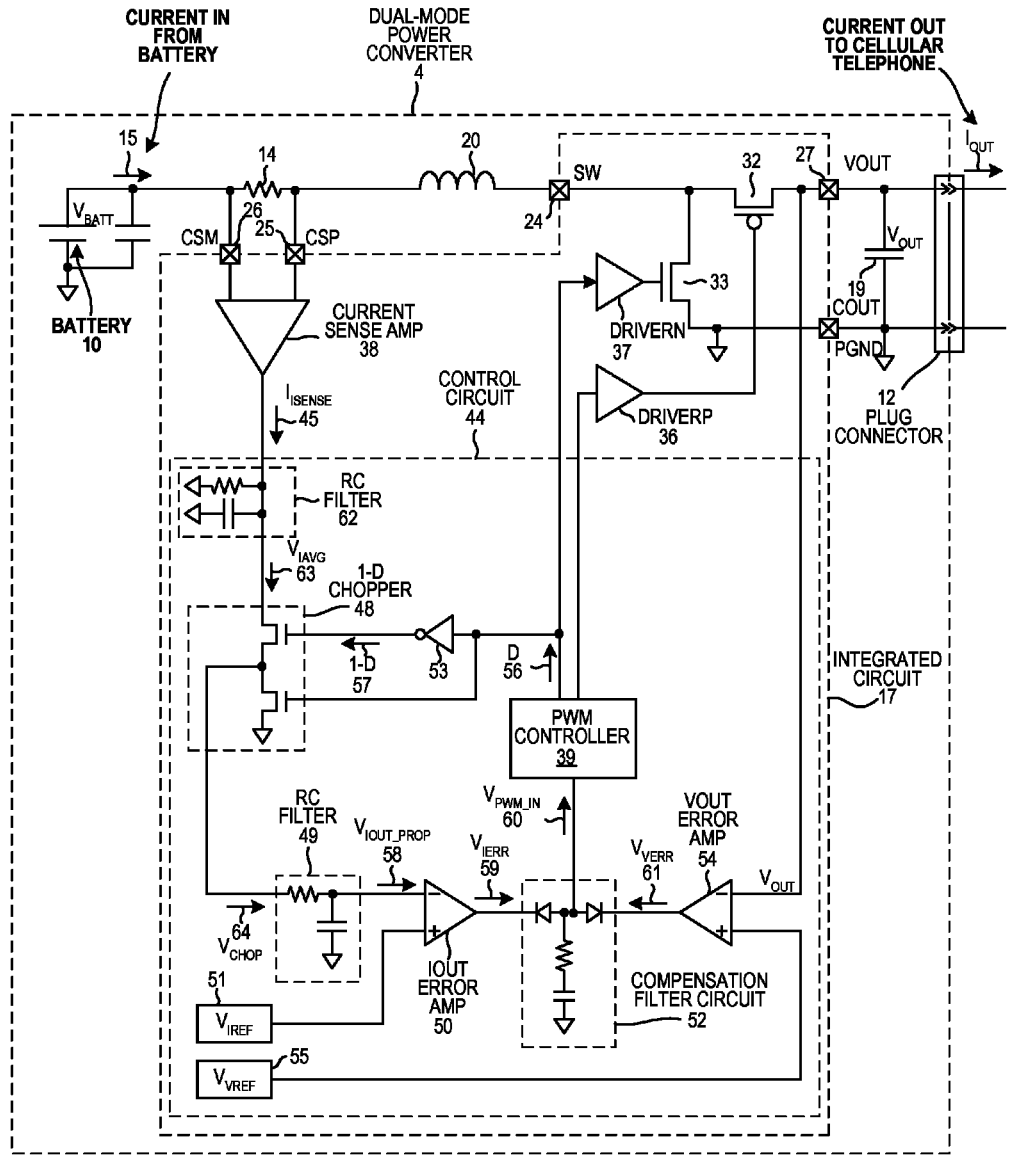
FIG. 4 is a diagram of another circuit usable in the boost mode to generate the signal $V_{IOUT\_PROP}$.

FIG. 4 is a diagram of another circuit usable in the boost mode to generate the signal $V_{IOUT\_PROP}$. The circuit is similar to the circuit of FIG. 3, except that a low pass filter 62 first converts the current signal $I_{ISENSE}$ to a voltage signal, and averages the voltage signal. The resulting averaged voltage signal $V_{IAVG}$ 63 is then supplied to the 1-D chopper 48. The chopper 48 of FIG. 4 has a different structure as compared to the chopper 48 of FIG. 3 because the chopper of FIG. 4 is a chopper that receives a voltage signal whereas the chopper of FIG. 3 is a chopper that receives a current signal. The signal $V_{CHOP}$ from the 1-D chopper 48 is averaged by low pass filter 49, thereby generating the signal $V_{IOUT\_PROP}$.

Figure 5:
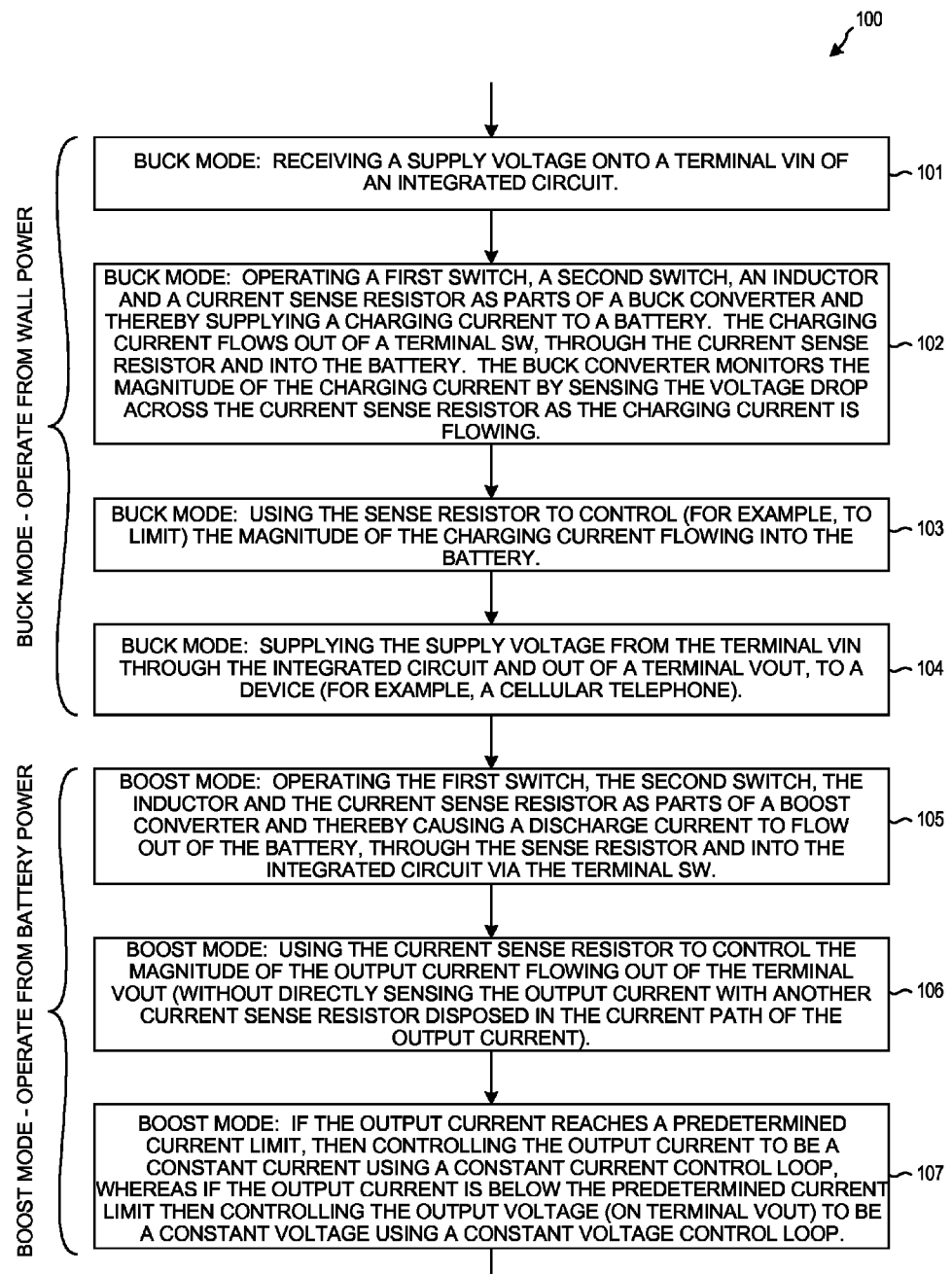
FIG. 5 is a flowchart of a method 100 in accordance with one novel aspect.

FIG. 5 is a flowchart of a method 100 in accordance with one novel aspect. In a buck mode of operation, the converter receives (step 101) a supply voltage onto terminal VIN. The control circuit operates the first switch, the second switch, the inductor, and the current sense resistor as parts of a buck converter (step 102), thereby supplying a charging current to the battery. The charging current flow out of terminal SW, through the current sense resistor, and into the battery. The buck converter monitors the magnitude of the charging current by sensing the voltage drop across the current sense resistor as the charging current is flowing. The sense resistor is used to control (step 103) the magnitude of the charging current flowing into the battery. The supply voltage from the terminal VIN is supplied (step 104) through the integrated circuit and out of terminal VOUT to a device (for example, a cellular telephone). In a boost mode of operation, the converter receives power from the battery. The converter operates the first switch, the second switch, the inductor, and the current sense resistor as parts of a boost converter (step 105), thereby causing a discharge current to flow out of the battery, through the sense resistor, and into the integrated circuit via the terminal SW. The current sense resistor is used (step 106) to control the magnitude of the output current flowing out of the terminal VOUT (without directly sensing the output current with anther current sense resistor disposed in the current path of the output current). If the output current reaches a predetermined current limit, then the output current is controlled (step 107) to be a constant current using a constant current control loop, whereas if the output current is below the predetermined current limit then the output voltage (on terminal VOUT) is controlled to be a constant voltage using a constant voltage control loop. The very same current sense resistor that was used in the buck mode to monitor and control the magnitude of the charging current is used in the boost mode to determine the control the magnitude of the output current.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An integrated circuit adapted for use with a current sense resistor, an inductor, a battery and an output capacitor, wherein the current sense resistor, the inductor, the battery and the output capacitor are external to the integrated circuit, the integrated circuit comprising:
   a first terminal VIN;
   a second terminal SW;
   a third terminal CSP;
   a fourth terminal CSM;
   a fifth terminal VOUT;
   a sixth terminal PGND;
   a first switch connected directly between the fifth terminal and the second terminal;
   a second switch connected directly between the second terminal and the sixth terminal; and
   a control circuit that controls the first and second switches in a buck mode such that a current flows in a current path out of the integrated circuit from the second terminal, through the inductor, through the current sense resistor, and into the battery thereby charging the battery, wherein the current sense resistor is coupled between the third and fourth terminals, wherein the output capacitor is coupled between the fifth and sixth terminals, and wherein the control circuit controls a magnitude of the current at least in part by detecting a magnitude of the current as a voltage drop across the current sense resistor.

2. The integrated circuit of claim 1, wherein the control circuit uses the voltage drop across the current sense resistor to generate a signal VIOUT_PROP whose magnitude varies in proportion to a magnitude of a control current flowing out of the fifth terminal, and wherein the control circuit generates an error signal by comparing a reference voltage to the signal VIOUT_PROP.

3. The integrated circuit of claim 2, wherein the magnitude of the signal VIOUT_PROP varies in proportion to the magnitude of the control current flowing out of the fifth terminal irrespective of changes in the voltage on the fifth terminal and irrespective of changes in a battery voltage of the battery.

4. The integrated circuit of claim 1, wherein the control circuit is operable in the buck mode and in a boost mode, wherein in the boost mode an output voltage on the fifth terminal is controlled by a voltage control feedback loop to be a constant voltage unless a control current reaches a current limit in which case the control current is controlled not to exceed a predetermined current.

5. The integrated circuit of claim 1, wherein the control circuit comprises:
   a current sense amplifier coupled to the third and fourth terminals;
   a low pass filter coupled to receive a signal from the current sense amplifier;
   an error amplifier having a first input lead and a second input lead, wherein a signal from the low pass filter is received onto the first input lead of the error amplifier; and
   a pulse width modulator coupled to receive a signal output by the error amplifier, wherein the pulse width modulator supplies control signals to the first and second switches.

6. The integrated circuit of claim 5, wherein the pulse width modulator receives the signal output by the error amplifier via a compensation filter circuit.

7. The integrated circuit of claim 5, wherein the pulse width modulator supplies the control signals to the first and second switches via driver circuits.

8. The integrated circuit of claim 1, wherein the control circuit is operable in the buck mode and in a boost mode, wherein in the boost mode the first and second switches are controlled such that a second current flows in a second current path from the battery, through the current sense resistor, through the inductor, and into the integrated circuit via the second terminal, wherein the control circuit controls a magnitude of a third current in the boost mode at least in part by detecting a magnitude of the second current as a voltage drop across the current sense resistor, and wherein the third current in the boost mode flows out of the integrated circuit via the fifth terminal.

9. The integrated circuit of claim 8, wherein the control circuit does not sense the magnitude of the third current directly.

10. The integrated circuit of claim 8, wherein there is no current sense resistor disposed in a current path of the third current.

11. The integrated circuit of claim 8, wherein the third current is controlled in the boost mode to be a constant current.

12. A method comprising:
   operating an integrated circuit in a buck mode and in a boost mode, wherein the integrated circuit includes a first terminal VIN, a second terminal SW, a third terminal CSP, a fourth terminal CSM, a fifth terminal VOUT, a sixth terminal PGND, a first switch and a second switch;
   receiving a supply voltage onto the first terminal VIN in the buck mode;

supplying a charging current into a battery in the buck mode, wherein the charging current flows out of the integrated circuit from the second terminal SW, through an inductor, through a current sense resistor, and into the battery, wherein the current sense resistor is coupled between the third terminal CSP and the fourth terminal CSM, and wherein the current sense resistor, the inductor, and the battery are external to the integrated circuit; and controlling a magnitude of the charging current flowing into the battery in the buck mode using the current sense resistor.

13. The method of claim 12, wherein the integrated circuit includes a current sense amplifier, a low pass filter, an error amplifier and a pulse width modulator, wherein the current sense amplifier is coupled to the third terminal CSP and the fourth terminal CSM, and wherein the supplying the charging current comprises:

receiving a first signal from the current sense amplifier onto the low pass filter;

receiving a second signal from the low pass filter onto the error amplifier; and receiving a third signal output by the error amplifier onto the pulse width modulator, wherein the pulse width modulator supplies control signals to the first and second switches.

14. The method of claim 12, further comprising:

in the boost mode using the first switch, the second switch, the inductor, and the current sense resistor to supply an output current out of the fifth terminal VOUT, wherein in the boost mode a current flows from the battery, through the current sense resistor, through the inductor, and into the integrated circuit via the second terminal SW; and in the boost mode using the current sense resistor to control a magnitude of the output current flowing out of the fifth terminal VOUT, wherein the magnitude of the output current is controlled without directly sensing the output current.

15. The method of claim 14, wherein there is no current sense resistor disposed in a current path of the output current.

16. The method of claim 14, wherein in the boost mode the output current is controlled by a current control feedback loop to be a constant current if the output current is greater than a predetermined current, whereas if the output current is not greater than the predetermined current then a voltage control feedback loop operates to control an output voltage on the fifth terminal VOUT to be a constant voltage.

17. The method of claim 14, wherein in the boost mode an output voltage on the fifth terminal VOUT is controlled by a voltage control feedback loop to be a constant voltage unless the output current reaches a current limit in which case the output current is controlled not to exceed a predetermined current.

18. An integrated circuit comprising:
a first terminal;
a second terminal;
a third terminal;
a fourth terminal;
a fifth terminal;
a sixth terminal;
a first switch connected directly between the fifth terminal and the second terminal;
a second switch connected directly between the second terminal and the sixth terminal; and
means for controlling the first and second switches in a buck mode such that a first current flows in a first current path out of the integrated circuit from the second terminal, through an inductor, through a current sense resistor, and into a battery thereby charging the battery, wherein the current sense resistor is coupled between the third and fourth terminals, wherein an output capacitor is coupled between the fifth and sixth terminals, wherein the means controls a magnitude of the first current in the buck mode at least in part by detecting a magnitude of the first current as a voltage drop across the current sense resistor, and wherein the inductor, the current sense resistor, the battery and the output capacitor are external to the integrated circuit.

19. The integrated circuit of claim 18, wherein in a boost mode the means controls the first and second switches such that a second current flows in a second current path from the battery, through the current sense resistor, through the inductor, and into the integrated circuit via the second terminal, wherein the means controls a magnitude of a third current in the boost mode at least in part by detecting a magnitude of the second current as a voltage drop across the current sense resistor, and wherein the third current in the boost mode flows out of the integrated circuit via the fifth terminal.

20. The integrated circuit of claim 19, wherein the means is also for controlling an output voltage on the fifth terminal in the boost mode using a voltage control feedback loop so that the output voltage is a constant voltage unless the third current reaches a current limit in which case the third current is controlled not to exceed a predetermined current.

* * * * *